(12) United States Patent
Ichikawa

(10) Patent No.: US 7,436,343 B2
(45) Date of Patent: Oct. 14, 2008

(54) SOLID STATE IMAGE PICKUP APPARATUS, CAMERA AND DRIVING METHOD OF SOLID STATE IMAGE PICKUP APPARATUS

(75) Inventor: Takeshi Ichikawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 11/275,508

(22) Filed: Jan. 11, 2006

(65) Prior Publication Data

US 2006/0158541 A1    Jul. 20, 2006

(30) Foreign Application Priority Data

Jan. 14, 2005   (JP)  ............... 2005-008182

(51) Int. Cl.
*H03M 1/82*     (2006.01)
(52) U.S. Cl. ............... 341/167; 348/272; 348/340
(58) Field of Classification Search ............ 341/167; 250/208.1; 348/272, 340
See application file for complete search history.

(56) References Cited

U.S. PATENT DOCUMENTS

| | | | | |
|---|---|---|---|---|
| 5,986,704 A | * | 11/1999 | Asai et al. ............ | 348/340 |
| 6,307,195 B1 | | 10/2001 | Guidash ............... | 250/208.1 |
| 2002/0195544 A1 | * | 12/2002 | Yamashita et al. ....... | 250/208.1 |
| 2003/0193586 A1 | * | 10/2003 | Hayakawa ............ | 348/272 |

FOREIGN PATENT DOCUMENTS

JP    2001-186414    7/2001

* cited by examiner

*Primary Examiner*—Jean B Jeanglaude
(74) *Attorney, Agent, or Firm*—Fitzpatrick, Cella, Harper & Scinto

(57) ABSTRACT

A solid state image pickup apparatus capable of reading a signal at a high speed while securing a wide dynamic range is provided. A signal based on a part of charges having overflown a photoelectric conversion unit (201) to a floating diffusion region (205) is quantified at an upper bit of an AD converter (206), and a signal based on charges stored in the photoelectric conversion unit (201) is quantified at a lower bit of the AD converter (206). Thereby, multi-bit data having a wide dynamic range can be taken out at a speed as high as possible without increasing the number of devices.

10 Claims, 11 Drawing Sheets

SOLID STATE IMAGE PICKUP APPARATUS, CAMERA AND DRIVING METHOD OF SOLID STATE IMAGE PICKUP APPARATUS

BACKGROUND OF THE INVENTION

1. Field of the Invention

The present invention relates to a solid state image pickup apparatus, a camera and a driving method of a solid state image pickup apparatus, and more particularly to an apparatus and a method which is suitably applied to a CMOS area sensor.

2. Description of Related Art

A charge coupled device (CCD) has been conventionally known as a solid state image pickup device, which converts an image signal into an electric signal. The CCD has a photodiode array, and is configured to apply a pulse voltage to charges stored in each photodiode to read the stored charges as an electric signal.

Moreover, in recent years, a CMOS area sensor, in which photodiodes and MOS transistors are produced on one chip, has been used as a solid state image pickup device. The CMOS area sensor has the following advantages: power consumption is small; drive power is small; speeding up becomes possible; and the like, in comparison with a CCD. Consequently, it is expected that the demand of the CMOS area sensor will be expanded in the future.

And a proposal of expanding the dynamic range of a solid state image pickup device using such a CMOS area sensor has been provided (Japanese Patent Application Laid-Open No. 2001-186414 (see corresponding U.S. Pat. No. 6,307,195)).

In the CMOS area sensor in such a proposal, each pixel includes a photodiode, a floating diffusion (hereinafter referred to an FD as the need arises) region, a transfer transistor for transferring charges from the photodiode to the FD region, and a reset transistor for resetting the FD region to predetermined potential. The CMOS area sensor is composed of such pixels arranged in a matrix.

The CMOS area sensor is configured as follows. That is, first, a signal based on charges stored in the photodiode is read, and after that, a signal based on the charges which have overflown the photodiode and have been stored in the FD region is read. Then, the read signals are output through an analog amplifier.

However the prior art needs signal reading two times, and outputs those signals through the analog amplifier. Consequently, an excessive restriction arises in the operation speed of the CMOS area sensor. Consequently, the prior art has a problem of the difficulty of suitably picking up a moving image which needs a high speed reading in real time when the prior art is used.

The present invention has been made in view of such a problem. It is an object of the present invention to provide a solid state image pickup apparatus capable of reading a signal at a high speed while securing a wide dynamic range, its driving method, and a camera using the solid state image pickup apparatus.

SUMMARY OF THE INVENTION

A solid state image pickup apparatus of the present invention includes a plurality of pixel units, each containing a photoelectric conversion unit, and an AD conversion unit converting an analog signal based on charges photoelectrically converted by the photoelectric conversion unit into a digital signal, wherein the AD conversion unit quantifies a digital signal converted from an analog signal based on charges having overflown from the photoelectric conversion unit as a bit upper than a bit corresponding to a capacity of charges capable of being stored within the photoelectric conversion unit, in converting the overflown analog signal into the digital signal.

A camera of the present invention includes the solid state image pickup apparatus, a lens for focusing an optical image on the solid state image pickup apparatus, and a diaphragm for changing a light quantity passing through the lens.

A driving method of a solid state image pickup apparatus of the present invention is a driving method of a solid state image pickup apparatus including a plurality of pixel units, each containing a photoelectric conversion unit, and an AD conversion unit converting an analog signal based on charges having received photoelectric conversion by the photoelectric conversion unit into a digital signal, wherein the method quantifies a digital signal converted from an analog signal based on charges overflown from the photoelectric conversion unit as a bit upper than a bit corresponding to a capacity of charges capable of being stored within the photoelectric conversion unit, in converting the overflown analog signal into the digital signal.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

Next, a first embodiment of the present invention is described with reference to the attached drawings.

Figure 1:
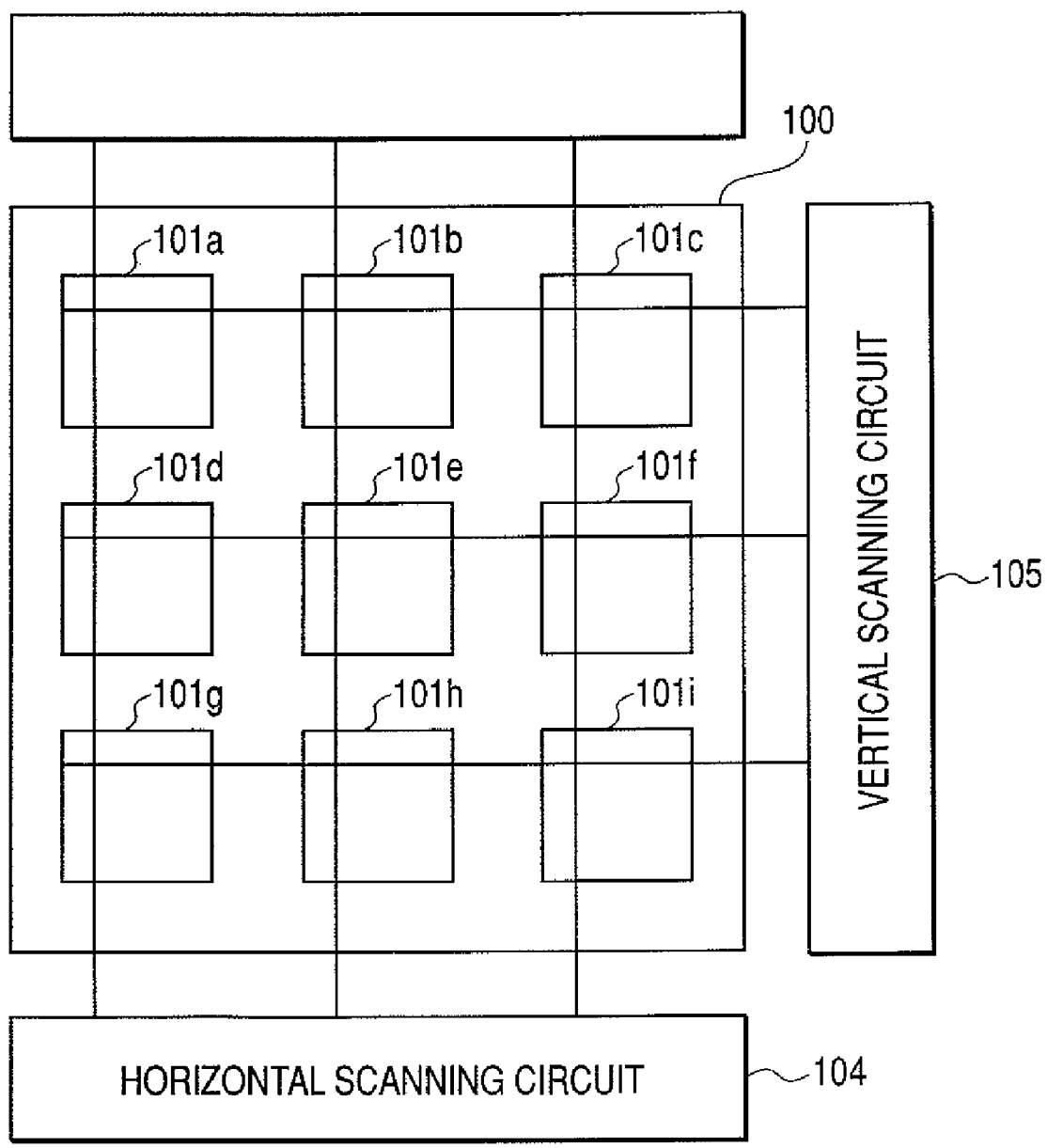
FIG. 1 is a diagram showing a first embodiment of the present invention which shows an example of the schematic configuration of a solid state image pickup apparatus.
Figure 2:
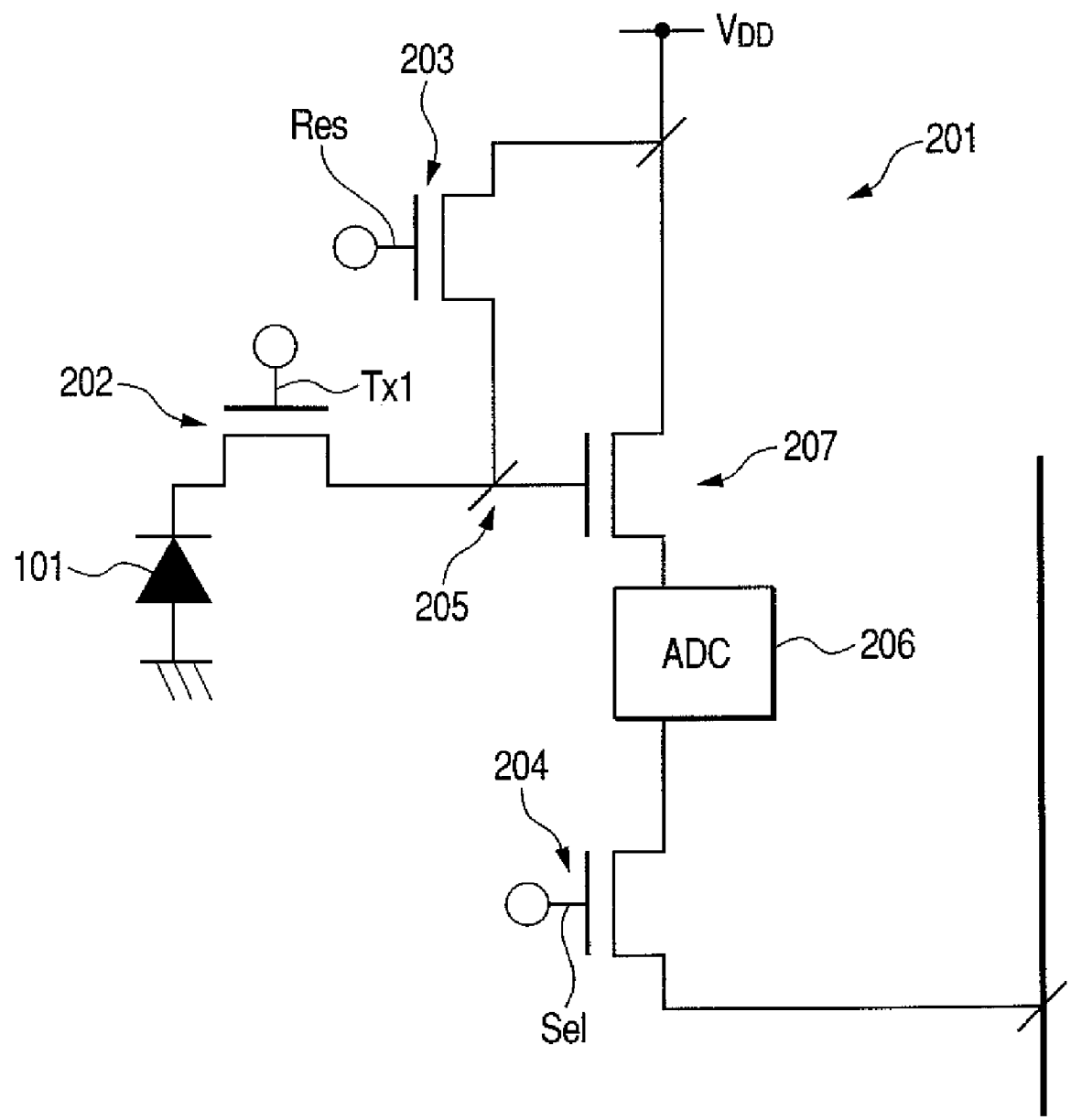
FIG. 2 is a diagram showing the first embodiment of the present invention which shows an example of an equivalent circuit of a CMOS sensor unit.

FIG. 1 is a diagram showing an example of the schematic configuration of a solid state image pickup apparatus of the present embodiment. FIG. 2 is a diagram showing an example of an equivalent circuit of a CMOS sensor unit 101.

In FIG. 1, a pixel area 100 is composed of a plurality of CMOS sensor units (pixels) 101a to 101i arranged in a two-dimensional matrix of three rows by three columns, each composed of a photoelectric conversion unit (for example, a photodiode) 201, transistors 202, 203, 204 and 207 and an AD converter 206.

Incidentally, although the plurality of CMOS sensor units (pixels) 101a to 101i is arranged in the two-dimensional matrix of three rows by three columns in FIG. 1, the number of arrangement of the CMOS sensor unit (pixel) 101 is not limited to this arrangement. For example, the plurality of CMOS sensor units (pixels) 101 may be arranged in a two-dimensional matrix of 1080 rows by 1960 columns. In this manner by increasing the number of the photoelectric conversion units 201, the resolution of the pixel area may be improved.

In FIG. 2, the photoelectric conversion unit 201 is connected to an FD region 205 through a transfer switch 202. A reset switch 203 is for setting the potential of the FD region 205 to power source potential $V_{DD}$. The FD region 205 includes a capacity, and is connected to the gate of a source follower MOS transistor 207. The source follower MOS transistor 207 is for amplifying the analog signal acquired by the FD region 205, and for transmitting the amplified analog signal to the AD converter (ADC) 206.

The AD converter 206 is for converting the analog signal transmitted from the source follower MOS transistor 207 into a digital signal. In this manner, in the present embodiment, a photoelectrically converted analog signal is converted into a digital signal in each pixel. A selection switch 204 is for performing the control of the selection or the nonselection of the pixel 101 of the CMOS sensor.

In the present embodiment, the transfer switch 202, the reset switch 203 and the selection switch 204 are made of MOS transistors, and are controlled by gate signals supplied to the gates of the respective MOS transistors. To put it concretely, a control signal TX1 is supplied to the gate of the transfer switch 202; a control signal Res is supplied to the gate of the reset switch 203; and a control signal Sel is supplied to the gate of the selection switch 204.

Here, the control signal TX1 is a control signal for transferring the charges from the photoelectric conversion unit 201 to the FD region 205. Moreover, the control signal Res is a control signal for resetting the FD region 205. Furthermore, the control signal Sel is a control signal for selecting the pixel 101.

A vertical scanning circuit 105 is a circuit for selecting the CMOS sensor units 101 arranged in the pixel area 100 one by one by the row.

Moreover, although not shown in FIG. 1, row memory circuits are provided in the solid state image pickup apparatus of the present embodiment. Each of the row memory circuits includes a signal level holding capacity holding the signal level (S) stored in, for example, the photoelectric conversion unit 201, a signal level holding capacity holding the signal level (BS) having overflown the photoelectric conversion unit 201, and a reset level holding capacity holding a reset level (N).

Incidentally, in the present embodiment, the following are supposed: a holding operation of the signal level (S) is performed by a control signal S; a holding operation of the signal level (BS) is performed by a control signal BS; and a holding operation of the reset level (N) is performed by a control signal N.

A horizontal scanning circuit 104 is a circuit for transferring the signal levels (S), (BS), and the reset levels (N) for one row held in the row memory circuits.

Figure 3:
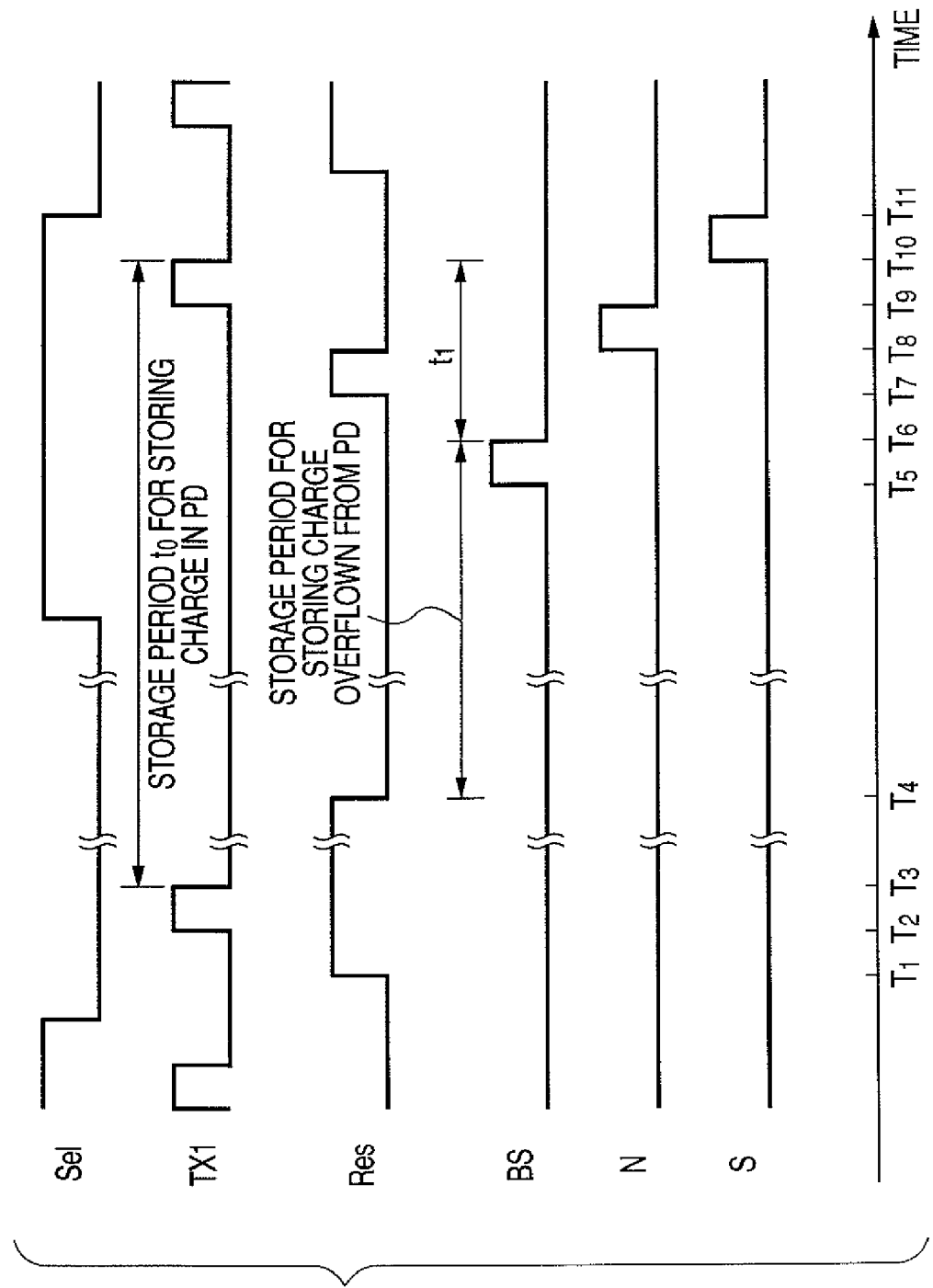
FIG. 3 is a timing chart showing the first embodiment of the present invention which illustrates an example of the operation of the solid state image pickup apparatus.

Here, an example of the operation of the solid state image pickup apparatus of the present embodiment is described with reference to the timing chart of FIG. 3.

First, after resetting the FD region 205 and the photoelectric conversion unit 201 by conducting the transfer switch 202 and the reset switch 203 (times T1, T2), the transfer switch 202 is closed (a time T3) to start the storage of charges in the photoelectric conversion unit 201. When a large light quantity has entered the photoelectric conversion unit 201 and a light quantity which is the one that the photoelectric conversion unit 201 can store or more has entered the photoelectric conversion unit 201, charges begin to overflow the photoelectric conversion unit 201, and a part of the charges are stored in the FD region 205 (times T4 to T6).

After that, a signal based on the charges stored in the FD region 205 is stored in an upper bit of the AD converter 206 to read the signal (times T5, T6). Here, the upper bit means a bit upper than a bit corresponding to the capacity of the charges which can be stored in the photoelectric conversion unit 201. For example, when it is supposed that the bits corresponding to the capacity of the charges which can be stored in the photoelectric conversion unit 201 are eight bits, the upper bit means the bits on and after the ninth bit.

After that, the FD region 205 is again reset by conducting the reset switch 203 (times T7, T8), and the signal of a reset level (N) is read as a noise signal (times T8, T9). After that, the transfer switch 202 is conducted to read the ordinary signal based on the charges which have been stored in the photoelectric conversion unit 201, and the signal of the lower bits of the AD converter 206 is read (times T9 to T11).

The signal of the lower bits is one from which reset noises and the like have been removed. Consequently, in the solid state image pickup apparatus of the present embodiment, it becomes possible to take out a signal having a high SN ratio. Moreover, when no charges overflow the photoelectric conversion unit 201, a signal with little noises can be acquired as it is by the operation of reading the ordinary signal based on the charges stored in the photoelectric conversion unit 201.

After that, the signal quantified at the AD converter 206 is output to the outside as a digital signal.

Next, an example of the method of converting a signal based on (a part of) the charges having overflown the photoelectric conversion unit 201 to the FD region 205 into an actual light quantity is described. Here, the case where light quantity exceeding the number of saturated electrons of the photoelectric conversion unit is irradiated is considered.

If reference characters are supposed as follows: Y denotes a rate of the charges having overflown the photoelectric conversion unit 201 to the FD region 205; Z denotes the number of the actually detected electrons as the charges having overflown; P denotes the number of saturated electrons; and X denotes the number of electrons having been actually photoelectrically converted by the photoelectric conversion unit 201, then the following formula (1) is true.

$$(X-P) \times Y \times (t_0-t_1)/t_0 = Z \quad (1)$$

Here, a reference character $t_1$ denotes a difference between the storage end time (for example, the time T10 of FIG. 3) of the charges in the photoelectric conversion unit 201 and the storage end time (for example, the time T6 of FIG. 3) of the charges having overflown the photoelectric conversion unit 201. Moreover, a reference numeral $t_0$ denotes a storage time of charges in the photoelectric conversion unit 201 (for example, a difference between the time T10 the tine T3 of FIG. 3).

Then, the number X of the actual electrons having been photoelectrically converted by the photoelectric conversion unit 201 is expressed by the following formula (2).

$$X = Z \times t_0/(Y \times (t_0-t_1)) + P \quad (2)$$

Accordingly, the rate of the signal to be quantified at the upper bit in the AD converter 206 can be regulated by adjusting the rate Y of the charges having overflown the photoelectric conversion unit 201 to the FD region 205, and the value $\{(t_0-t_1)/t_0\}$.

Then, when the quantity of the light entering the photoelectric conversion unit 201 is large, it is known that it is preferable to shorten the time $(t_0-t_1)$.

For example, when it is supposed that Y=0.01 (=1%) and $(t_0-t_1)/t_0=0.5$, the number X of the actual electrons having been photoelectrically converted by the photoelectric conversion unit 201 can be expressed by the following formula (3).

$$X = 200Z + P \quad (3)$$

Here, it is supposed that the number P of the saturated electrons is 10000, when the light of the light quantity by which 30000 electrons are photoelectrically converted enters the photoelectric conversion unit 201 (i.e. when the number X of the actual electrons having been photoelectrically converted by the photoelectric conversion unit 201 is 30000), the number Z of the electrons actually detected becomes 100.

On the other hand, if the following are supposed: Y=0.01 (=1%); $(t_0-t_1)/t_0=0.01$; the number P of the saturated electrons is 10000; and the number X of the actual electrons photoelectrically converted by the photoelectric conversion unit 201 is 30000, then the number Z of the actually detected electrons is two. In this case, even if the number X of the actual electrons photoelectrically converted by the photoelectric conversion unit 201 is 300000, the number Z of the actually detected electrons becomes 29.

As described above, when the quantity of the light entering the photoelectric conversion unit 201 is large, it is preferable to shorten the time $(t_0-t_1)$ because the number Z of the actually detected electrons can be lessened by the shortening.

Moreover, if it is supposed that the number P of the saturated electrons is 10000 in case of 8-Bit AD, the number of the saturated electrons in one least significant bit (LSB) is about forty. Then, if the ninth Bit or more higher Bit is 1, all of the more lower Bits are 1, and the number 1 in the ninth Bit means $2^8 \times 40 + 10000$. The number of the value indicates that 20000 electrons are generated. If it is supposed that the number X of the actual electrons photoelectrically converted by the photoelectric conversion unit 201 is 20000 when the number of the charges having overflown from the photoelectric conversion unit 201 into the FD region 205 is fourty, then the rate Y of the charges having overflown the photoelectric conversion unit 201 to the FD region 205 becomes 0.01 (=1%), and the value $\{(t_0-t_1)/t_0\}$ becomes 0.1. When such setting is adopted, the detection of the ninth bit or more (the detection of the overflowed charges) can be performed by a rate similar to the first to the eighth bits (the charges stored in the photoelectric conversion unit 201). Moreover, because time is known, it is of course possible to perform the conversion to the setting described above after taking out signals.

As described above, in the present embodiment, the signal based on a part of the charges having overflown the photoelectric conversion unit 201 to the FD region 205 is quantified at the upper bit of the AD converter 206. Consequently, data of multi bits having a wide dynamic range can be taken out at a speed as high as possible with a simple configuration. Accordingly, for example, by performing the reading of a signal based on the charges stored in the photoelectric conversion unit 201 and the reading of a signal based on the charges having overflown the photoelectric conversion unit 201 in a frame at the time of performing moving image photographing, the moving image photographing can be performed more suitably than the prior art.

Second Embodiment

Next, a second embodiment of the present invention is described. In the first embodiment described above, the AD converter 206 is provided to each pixel, and an analog signal is converted into a digital signal in each pixel. On the other hand, in the present embodiment, an analog signal is converted into a digital signal by each column. In this manner, because the present embodiment differs from the first embodiment only in the method of converting an analog signal into a digital signal, in the following descriptions, by denoting the same portions as those of the first embodiment by the same reference marks as those shown in FIGS. 1 to 3, and the like, the detailed descriptions of the same portions are omitted.

Figure 4:
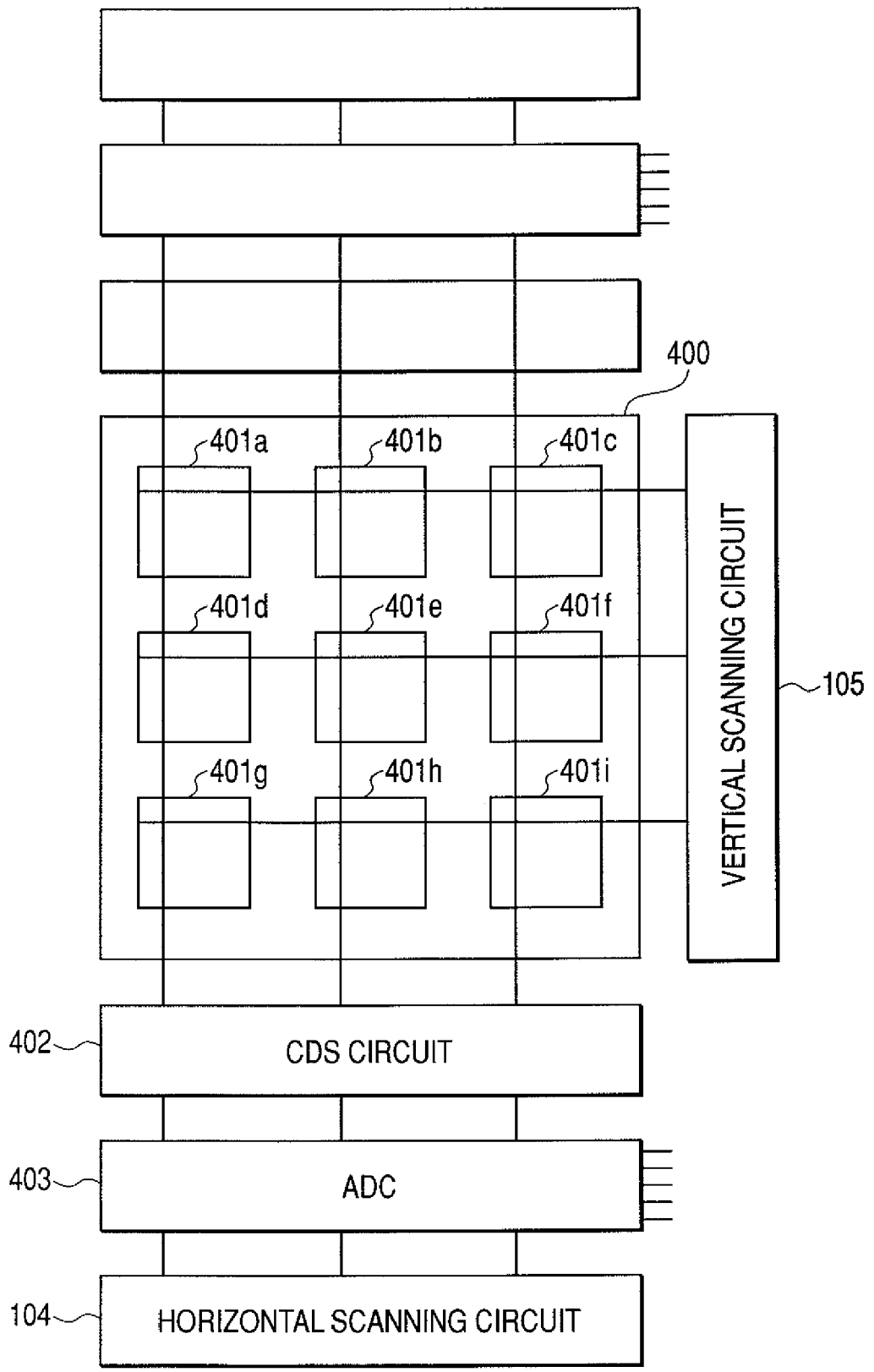
FIG. 4 is a diagram showing a second embodiment of the present invention which shows an example of the schematic configuration of a solid state image pickup apparatus.

FIG. 4 is a diagram showing an example of the schematic configuration of a solid state image pickup apparatus of the present embodiment.

In FIG. 4, a pixel area 400 is the same one as the pixel area 100 of the first embodiment excluding the AD converters 206. That is, the pixel area 400 is composed of a plurality of pixels 401 arranged in a two-dimensional matrix of three rows by three columns each of which pixels 401 is equipped with the photoelectric conversion unit 201 and the transistors 202, 203, 204 and 207. Incidentally, in FIG. 4, although the plurality of pixels 401 are arranged in the two-dimensional matrix of three rows by three columns, the numbers of the rows and the columns of the arrangement of the pixels 401 are not limited to those three's.

An analog signal output from each of the pixels 401 is input into a correlated double sampling (CDS) circuit unit 402 by a signal from the vertical scanning circuit 105. Then, the analog signal of each column output from the CDS circuit unit 402 is converted into a digital signal by an AD converter 403 for each column. And, signals are taken out one by one by the horizontal scanning circuit 104. In this manner, in the present embodiment, because an analog signal is converted into a digital signal by each column, the present embodiment can operate at a higher speed than that of the first embodiment. The arrangement area of the AD converters can be made smaller in the whole image pickup apparatus.

Figure 5:
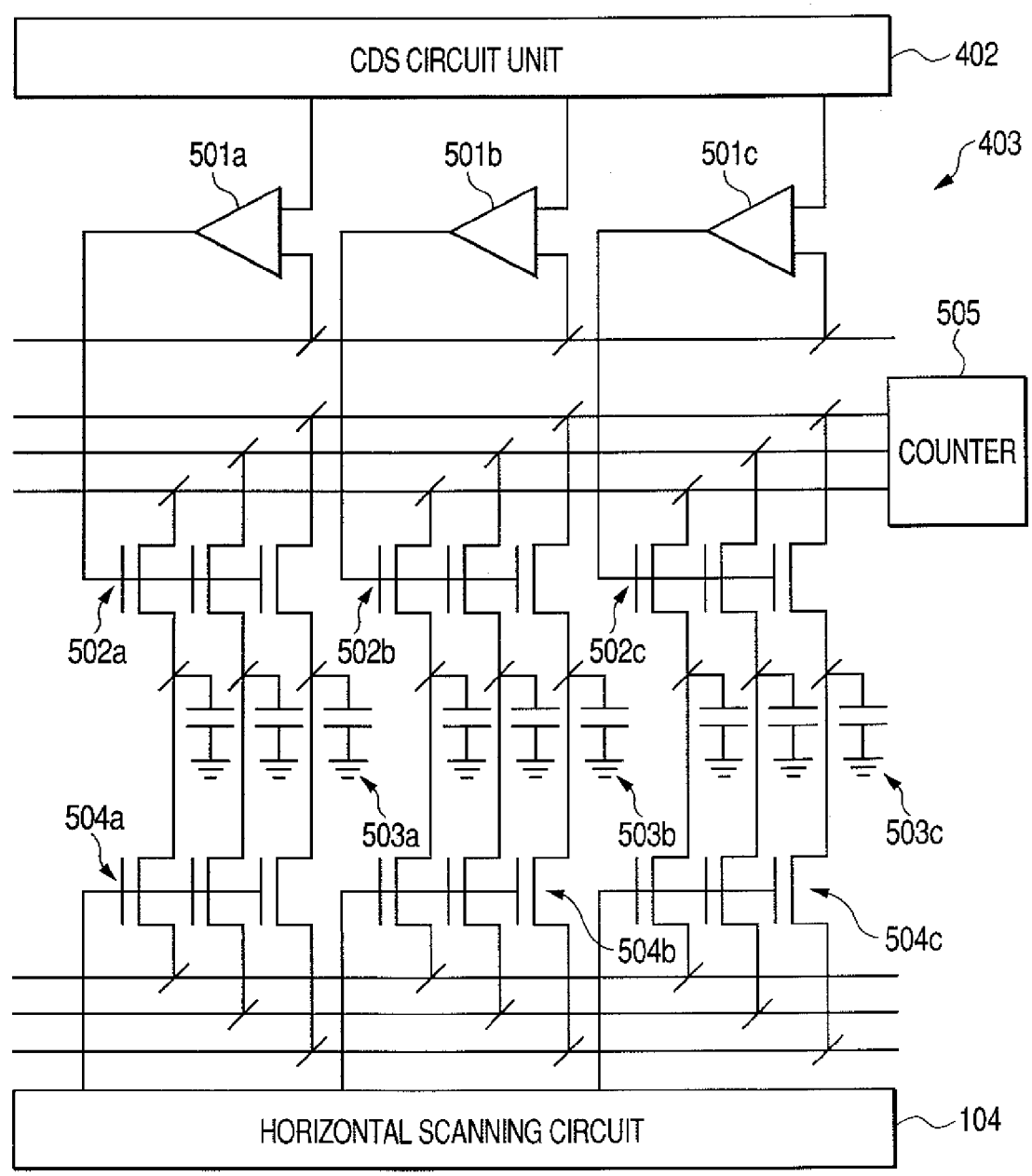
FIG. 5 is a diagram showing the second embodiment of the present invention which shows an example of the circuit configuration of an AD converter.

FIG. 5 is a diagram showing an example of the circuit configuration of the AD converter 403 for each column.

As shown in FIG. 5, the AD converters 403 are composed of comparators 501a to 501c, which are operators, storage units 503a to 503c, transfer switches 502a to 502c, read switches 504a to 504c, and a counter 505.

The comparators 501a to 501c of the present embodiment are voltage comparators, and are provided to the respective columns as shown in FIG. 5. The storage units 503a to 503c of the present embodiment are digital memories. A ramp type ADC architecture connected to a counter 505 common in the sensor is mainly used as each of the digital memories. The ramp type ADC architecture is next described. The signals input from the pixels 401 through the CDS circuit unit 402 are input into the respective ends on one sides of the voltage comparators 501a to 501c. Then, a triangular wave is input into each of the ends on the other sides of the comparators 501a to 501c. An AD conversion is performed by holding a value of the counter 505 at the time of the inversion of each of the voltage comparators 501a to 501c in each column into each of the storage units (digital memories) 503a to 503c in each column.

In the present embodiment, first, a signal (signal level (BS)) based on the charges having overflown the photoelectric conversion unit 201 is read by the AD converter 403 into an upper bit similarly in the first embodiment. Furthermore, a signal (signal level (S)) based on the charges stored in the photoelectric conversion unit 201 and a noise signal (reset level (N)) are read, and the read signals are input into the AD converter 403 into lower bits.

Figure 6:
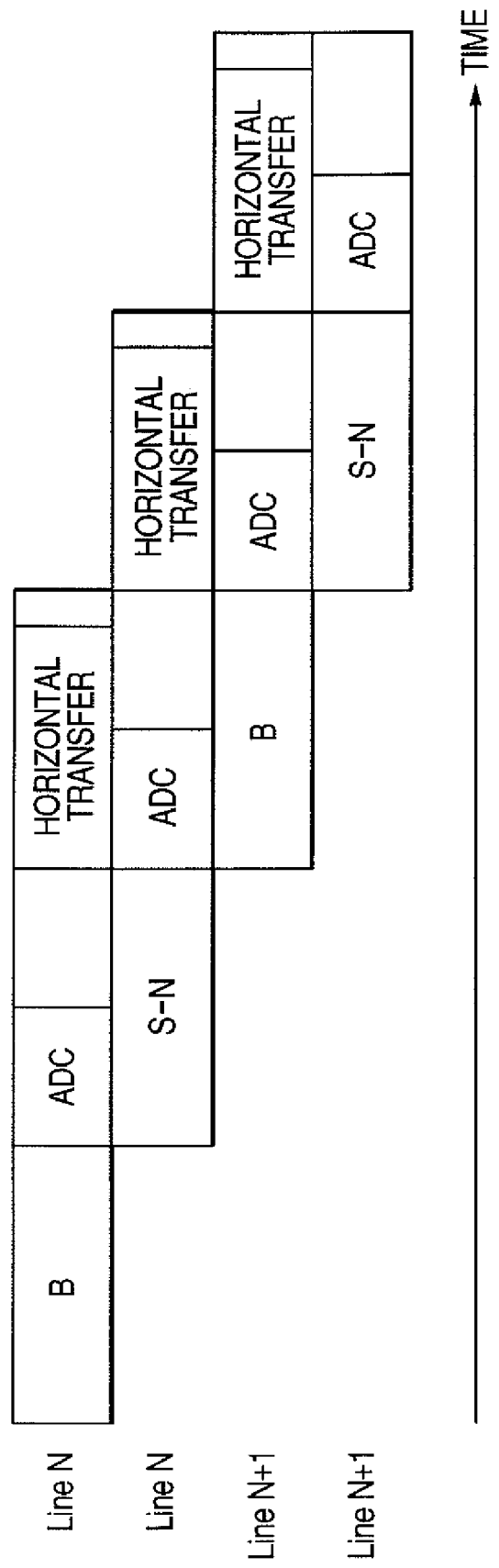
FIG. 6 is a diagram showing the second embodiment of the present invention which illustrates an example of the timing reading signals.

Here, an example of the timing of reading the signals is described using FIG. 6.

In FIG. 6, a reference character B denotes the reading of the charges (signal level (BS)) having overflown the photoelectric conversion unit 201. Moreover, a reference mark S-N denotes the reading of a signal level (S) and a reset level (N).

First, at the Nth row, the charges having overflown the photoelectric conversion unit 201 are read. While the analog signal based on the read charges is converted into a digital signal, the signal level (S) and the reset level (N) from the photoelectric conversion unit 201 are read. In this manner, because the reading operations of the upper bit and the lower bits of the Nth column can be performed in parallel, the present embodiment can operate at a higher speed.

Here, it is preferable to make the read time (B of FIG. 6) of the charges having overflown the photoelectric conversion unit 201, and read time (S-N of FIG. 6) of the signal level (S) from the photoelectric conversion unit 201 and a reset level (N) equal to each other. This is because of merits of enabling the equal setting of the times of horizontal transfers (horizontal transfers in FIG. 6) and the times of AD conversions (ADC's in FIG. 6) to make possible to use time effectively. However, it is needless to say that the present invention is not limited to such a driving method.

Moreover, when a moving image having a frame speed of 60 frames/s is picked up, it becomes possible to pick up an image having a wider dynamic range by operating the AD converter 403 and the like at, for example, a double speed of 120 Hz.

Moreover, it is also possible to photograph a certain region by a wide dynamic range by detecting overflown electrons, or to photograph a certain region by a normal operation, by referring to the signal of the preceding frame.

Further, in the present embodiment, although the case where charges are stored in the FD region 205 exemplified to be described, the place where the charges are stored are not especially limited, but the AD conversion can be performed completely similarly to the case described above even in the case where electrons and holes are stored another place. Moreover, in the present embodiment, although the reading of an upper bit and the reading of lower bits are performed using the same AD converter 403, the reading is not limited to using the same AD converter 403. In view of the production of the dispersion in each AD converter owing to noises or the like, the using of the same AD converter is advantageous. But, for example, a plurality of quite different AD converters may be used. In this case, it is also possible to read signals from the plurality of AD converters in parallel. By adopting such a configuration, it becomes possible to read signals faster.

Moreover, when overflown electrons exist, lower bits may be fixed without performing the reading of the lower bits. By performing like this, about the signals of the lower bits, it is also possible not to perform the AD conversion, which enables the lowering of power consumption. The fixed value at this time is not specified, and the fixed value may be a full value, zero, or an intermediate value. Moreover, a design which lets a user to set the fixed value may be adopted. Moreover, it is also possible to change the fixed value with time.

Third Embodiment

Next, a third embodiment of the present invention is described. In the present embodiment, a multi integrating type AD converter is used as the AD converter for each column. The present embodiment differs from the second embodiment only in that the configuration of the AD converter is different from that of the second embodiment. Accordingly, by denoting the same portions as those of the first and the second embodiments with the same reference marks as those shown in FIGS. 1 to 6, or by performing the similar mediums, the detailed descriptions of the same portions are omitted.

Figure 7:
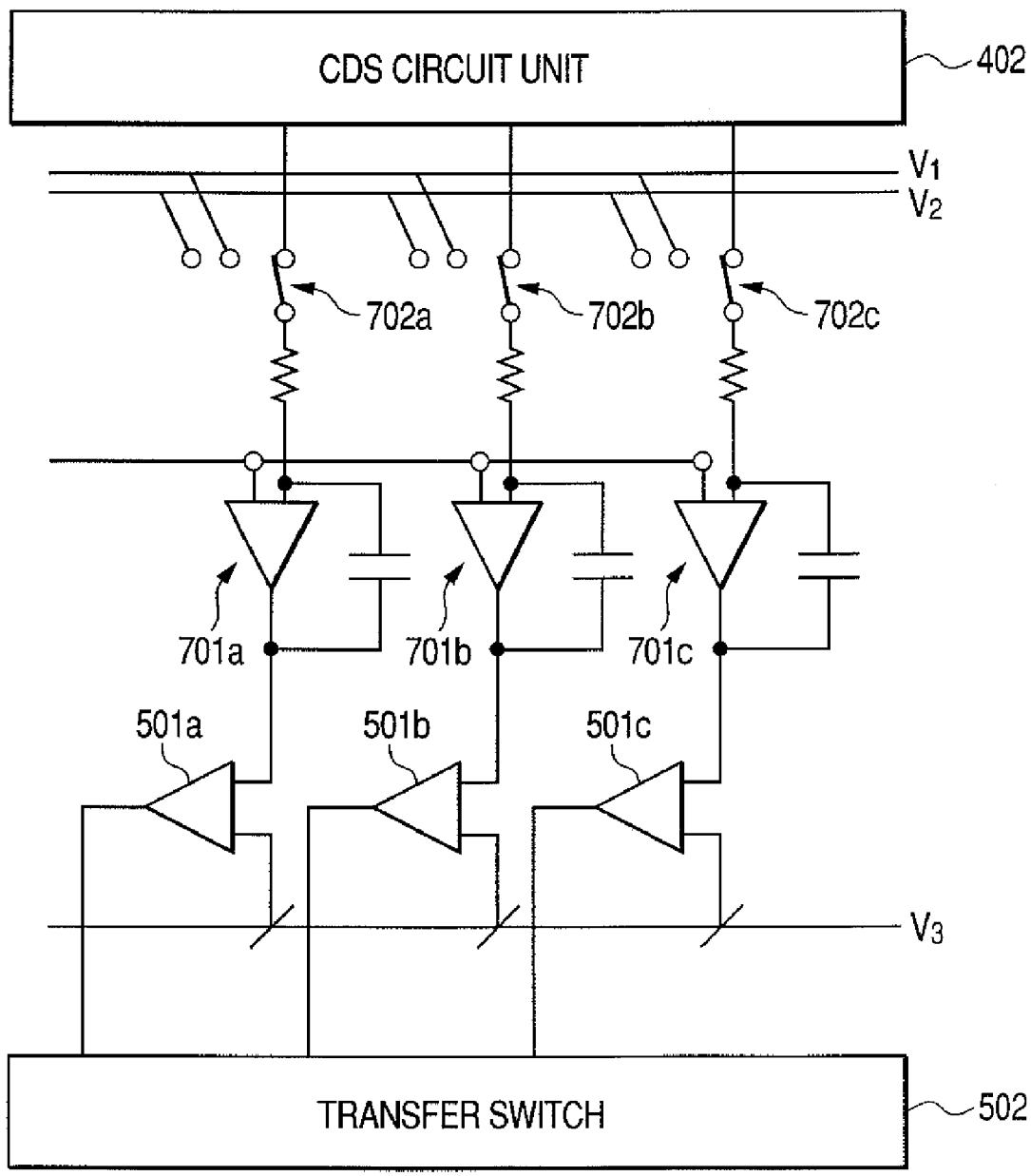
FIG. 7 is a diagram showing a third embodiment of the present invention which shows an example of the circuit configuration of an AD converter.

FIG. 7 is a diagram showing an example of the circuit configuration of the AD converter of the present embodiment. Incidentally, the comparators 501a to 501c and so forth are basically the same circuits as those of the second embodiment except for having a plurality of kinds of memory units through switches. Accordingly, in FIG. 7, a part of the circuits of the AD converters is omitted, and the detailed descriptions of the omitted part are omitted below.

In FIG. 7, reference numerals 701a to 701c denote integrators, and are circuits for outputting integration values of voltages dependently on output signals. Reference numerals 702a to 702c denote switches, and is for selecting any of two kinds of reference voltages V1 and V2 to each of the integrators 701a to 701c, and signals (voltages) output from the pixels 401 through the CDS circuit unit 402.

Figure 8:
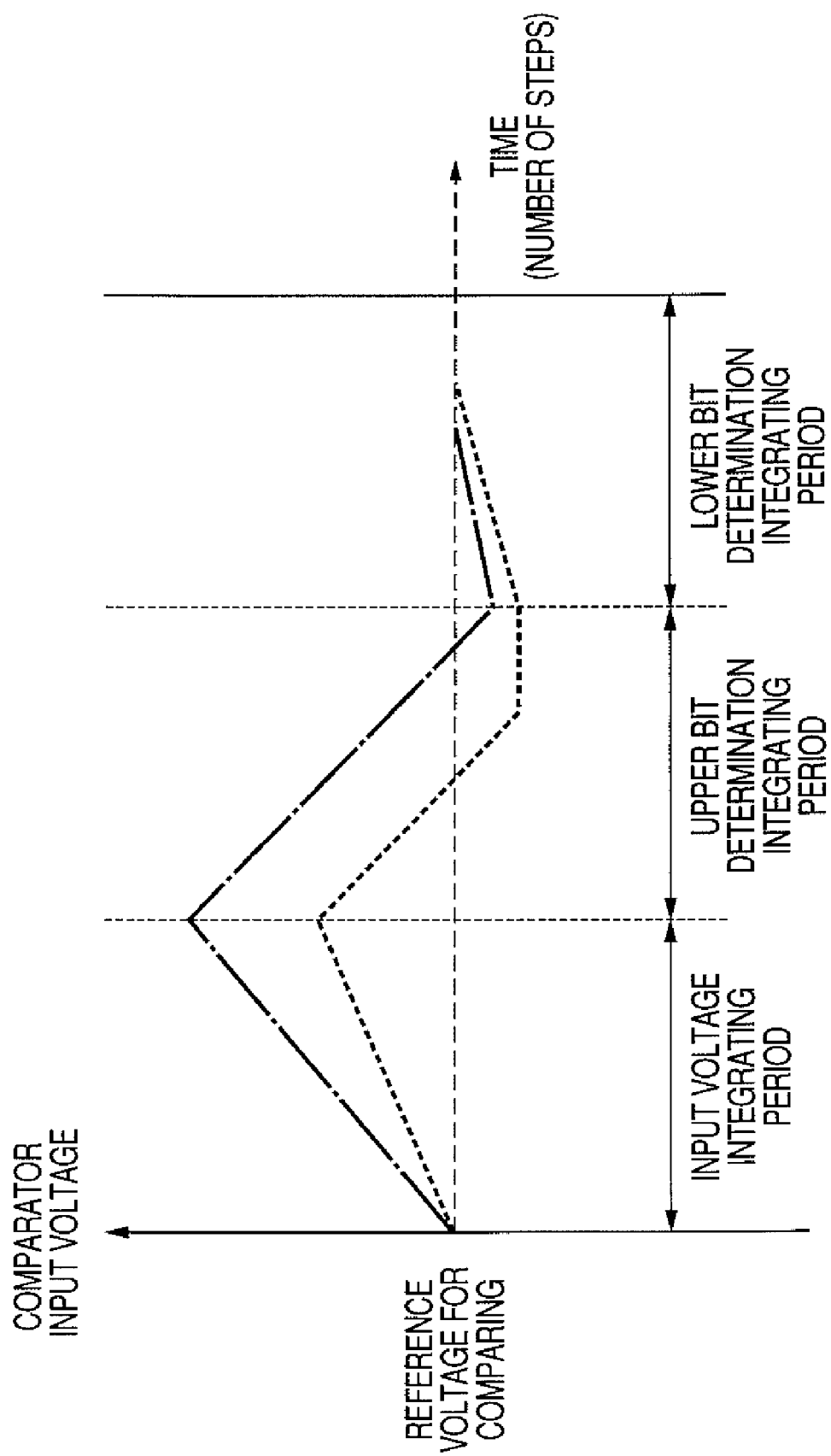
FIG. 8 is a diagram showing the third embodiment of the present invention which illustrating the operation of the AD converter.

Here, the operation of the AD converter of the present embodiment is described using FIG. 8.

The output values from the pixels 401 selected by the switches 702a to 702c are integrated by the integrators 701a to 701c, respectively, for a fixed period of time (input voltage integration period of time). Then, the integrated signals are input into the voltage comparators 501a to 501c, respectively.

Next, the inputs to the integrators 701a to 701c are changed from the signals of the pixels 401 to the reference voltage V1, respectively, and the judgments of the upper bits of the signals from the pixels 401 are performed. The judgments are realized by storing the value of the counter 505 when the voltages output from the integrators 701a to 701c have just exceed the reference voltage V3, which is the reference voltage for comparing, into a digital memory for upper bits.

Next, in order to judge the lower bits of the signals from the pixels 401, the inputs to the integrators 701a to 701c are changed into the reference voltage V2, and the integrators 701a to 701c perform integrals. At this time, the digital memories for lower bits are used. By doing so, for example, when the AD conversion of 12 bits is performed, the AD conversion is ended by $2^7$ steps of a result of adding $2^6$ steps for the upper bits and $2^6$ steps for the lower bits, not by $2^{12}$ steps. Consequently, the speeding up of the AD conversion is possible. Moreover, the method can deal with the increasing of bits.

Moreover, the circuit of the present embodiment does not need large capacity to each pixel 401. Consequently, the size of a chip can be reduced, and a high performance solid state image pickup device can be formed. In such a solid state image pickup apparatus of the present embodiment, the sensors, which are photoelectric conversion units, the read units and the AD converters can be configured by CMOS, and the division of the apparatus and the connection of the apparatus with a plurality of operators including switches can be easily performed. Consequently, a very effective solid state image pickup device can be configured by combining it with an active matrix operation.

If such an AD converter of the present embodiment is used, it would make it possible to secure a still wider dynamic range by outputting a signal based on overflown charges as a signal at a still upper bit.

Fourth Embodiment

Next, a fourth embodiment of the present invention is described. The present embodiment is provided with two kinds of integrators in the multi integrating type AD converter, and differs from the third embodiment only in a part of the configuration of the AD converter. Accordingly, by denoting the same portions as those of the first and the second embodiments by the same marks as those given in FIGS. 1 to 8, or the like, the detailed descriptions of the same portions are omitted.

Figure 9:
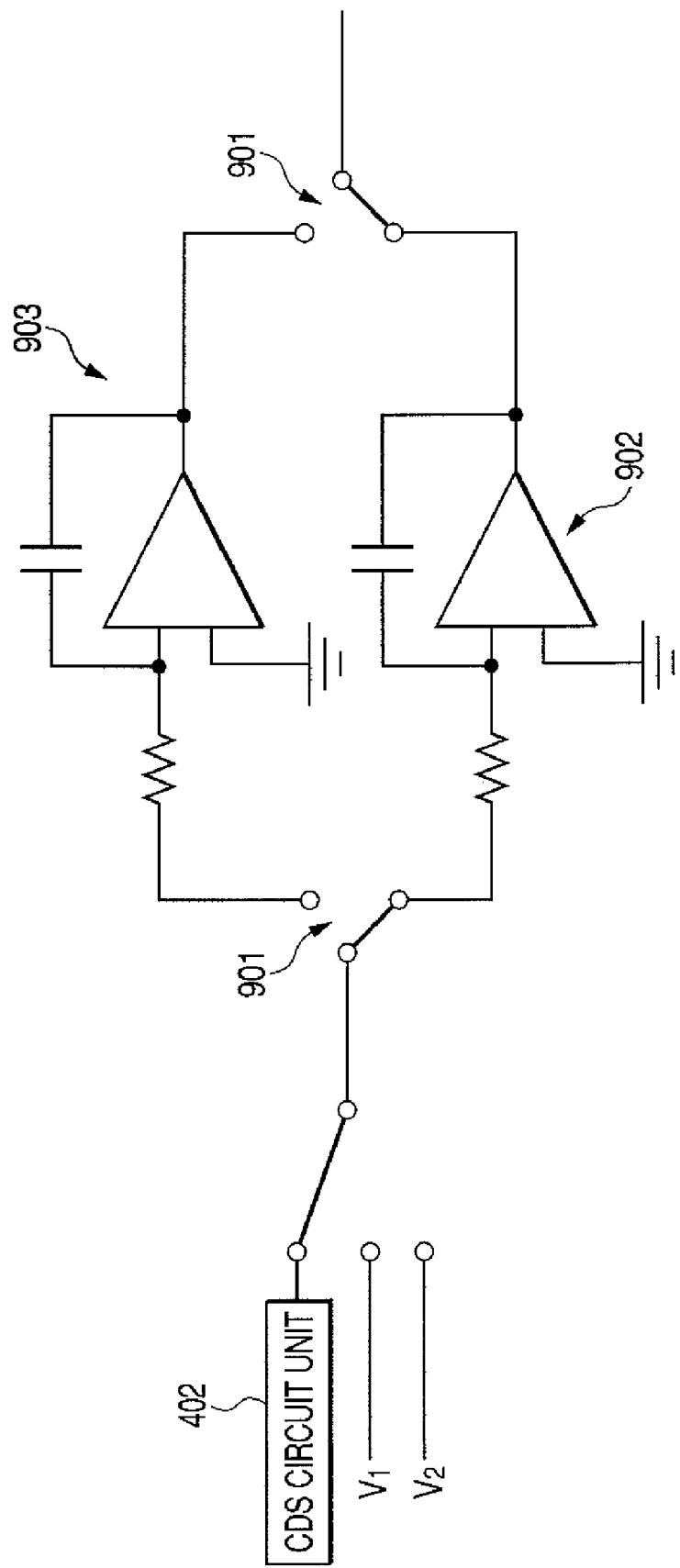
FIG. 9 is a diagram showing a fourth embodiment of the present invention which shows an example of the circuit configuration of an AD converter.

FIG. 9 is a diagram showing an example of the circuit configuration of an AD converter of the present embodiment. Incidentally, in FIG. 9, a part of the circuit of the AD converter is omitted, and the detailed description of the omitted part is omitted in the following.

In FIG. 9, first, the voltage of a signal output from a pixel 401 through the CDS circuit unit 402 is input into an integrator 902 from a switch 901. The voltage must correspond to all the output voltages. Consequently, the integrator 902 needs to be an integrator having a wide dynamic range.

Next, the input into the integrator 902 is changed from the signal of the pixel 401 to the reference voltage V1, and the judgment of the upper bit of the signal from the pixel 401 is performed. The judgment is realized by storing the value of the counter 505 at the time of exceeding the reference voltage V3, which is the reference voltage for comparing. Because the value of the counter 505 must correspond to all the output voltages also in this case, the integrator 161 needs to have the wide dynamic range.

Next, in order to judge the lower bits of the signal from the pixel 401, the input into the integrator is changed to the reference voltage V2 to perform integral. At this time, an integrator 903 is selected by the switch 901. The input voltage to the integrator 903 is near the reference voltage. Consequently, the dynamic range of the integrator 903 may be narrow, and can constitute the solid state image pickup apparatus using a more highly precise integrator.

By doing so, a solid state image pickup device with a highly precise AD conversion function can be formed, and it can also deal with an increase of the number of bits.

Incidentally, although the integrator for receiving the input of a signal from a pixel 401 and the integrator for receiving the input of the reference voltage V1 are made to be the same one in the present embodiment, the integrators are not especially limited to such a configuration. Moreover, two integrators may differ from one another. Moreover, the reference voltages may be three or more kinds, and each combination is also one of the design matters, and is not especially limited.

Other Embodiments

Figure 10:
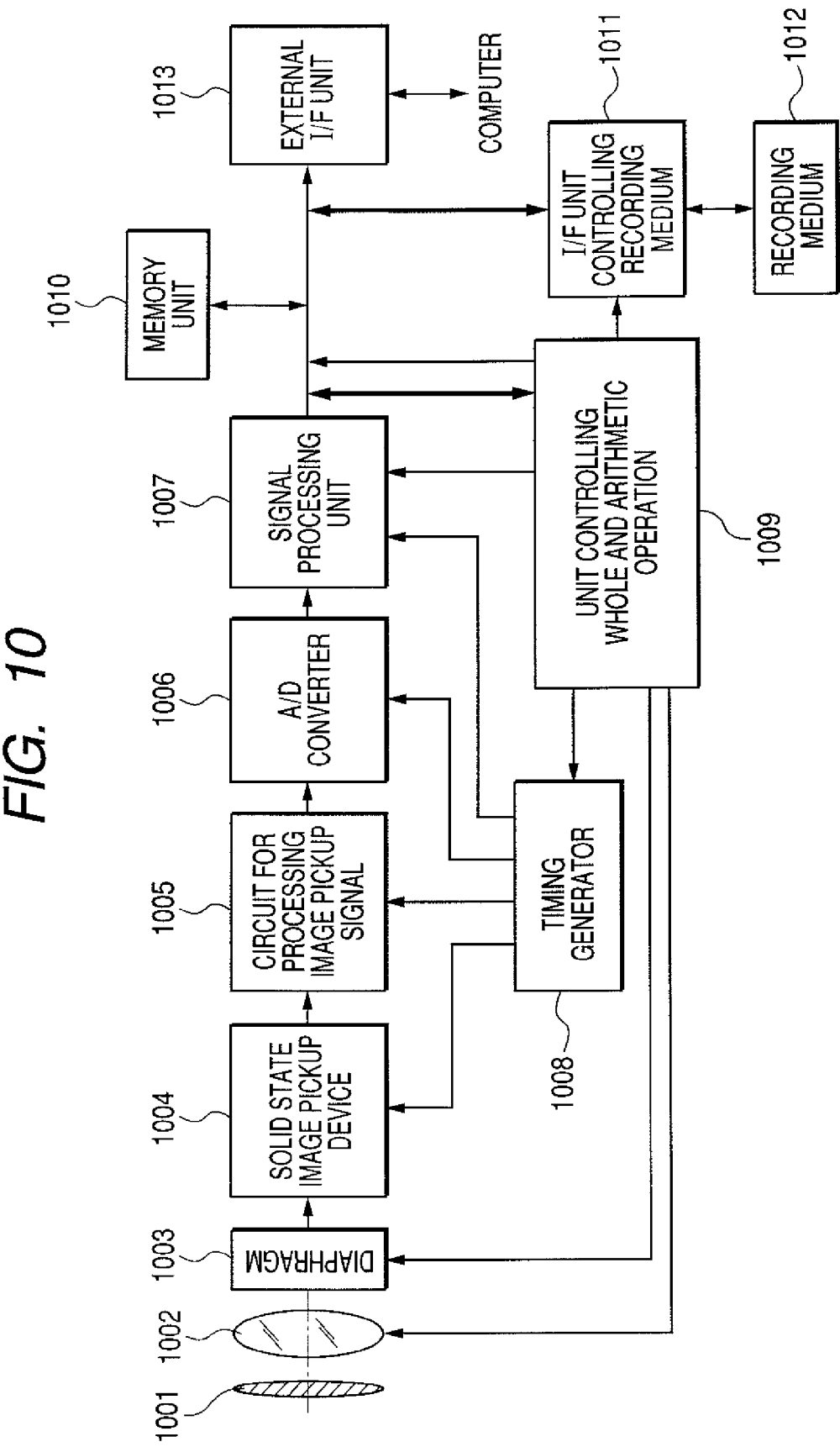
FIG. 10 is a block diagram showing another embodiment of the present invention which shows an example of the configuration of a still video camera.

One embodiment in the case of applying the solid state image pickup apparatus of each of the embodiments described above to a still camera is described in detail based on FIG. 10.

FIG. 10 is a block diagram showing the case where the solid state image pickup apparatus of each of the embodiments described above is applied to the "still video camera."

In FIG. 10, a reference numeral 1001 denotes a barrier which functions as both the protection and the main switch of a lens. A reference numeral 1002 denotes the lens providing an optical image of a subject onto a solid state image pickup device 1004. A reference numeral 1003 denotes a diaphragm for changing the light quantity having passed the lens 1002. The reference numeral 1004 denotes the solid state image pickup device for taking in the subject formed as the image with the lens 1002 as an image signal. A reference numeral 1006 denotes an A/D converter performing the analog-to-digital conversion of the image signal output from the solid state image pickup device 1004.

A reference numeral 1007 denotes a signal processing unit performing various corrections to the image data output from the A/D converter 1006, or compressing the data. A reference numeral 1008 denotes a timing generator outputting various timing signals to the solid state image pickup device 1004, a circuit 1005 for processing an image pickup signal, the A/D converter 1006 and the signal processing unit 1007. A reference numeral 1009 denotes a unit for controlling the whole and an arithmetic operation, which controls various operations and the whole still video camera. A reference numeral 1010 denotes a memory unit for storing image data temporarily. A reference numeral 1011 denotes an interface unit for performing record or read to a recording medium. A reference numeral 1012 denotes the recording medium such as a semiconductor memory for performing the record or the read of image data, and the like, which can be detached and attached. A reference numeral 1013 denotes an interface unit for communicating with an external computer or the like.

Next, the operation of the still video camera at the time of photographing in the configuration described above is described.

When the barrier 1001 is opened, the main power source is turned on, and then a power source of a control system turns on. Furthermore, a power source of image pickup system circuits such as the A/D converter 1006 is turned on.

Then, in order to control a light exposure, the unit 1009 for controlling the whole and an arithmetic operation opens the diaphragm 1003. The signal output from the solid state image pickup device 1004 is converted by the A/D converter 1006, and after that, the converted signal is input into the signal processing unit 1007.

The unit 1009 for controlling the whole and the arithmetic operation performs the operation of an exposure based on the data.

Judging the brightness based on the result of having performed the photometry, the unit 1009 for controlling the whole and the arithmetic operation controls the diaphragm.

Based on the signal output from the solid state image pickup device 1004, the unit 1009 for controlling the whole and the arithmetic operation takes out high-frequency components to perform an operation of the distance to the subject. After that, the unit 1009 for controlling the whole and the arithmetic operation drives the lens and judges whether the lens is in-focus or not. When the unit 1009 for controlling the whole and the arithmetic operation judges that the lens is not in-focus, the unit 1009 for controlling the whole and the arithmetic operation again drives the lens, and performs distance measurement.

Then, after in-focusing is confirmed, a main exposure is started.

After the exposure is completed, an image signal output from the solid state image pickup device 1004 receives A/D conversion by the A/D converter 1006, and the converted signal passes the signal processing unit 1007 to be written in the unit 1009 for controlling the whole and the arithmetic operation.

After that, the data stored in the memory unit 1010 passes the recording medium control I/F unit to be recorded in the recording medium 1012 such as a semiconductor memory or the like, which can be detached and attached, under the control of the unit 1009 for controlling the whole and the arithmetic operation. Moreover, the data may pass the external I/F unit to be directly input into a computer or the like, and the image may be processed.

Figure 11:
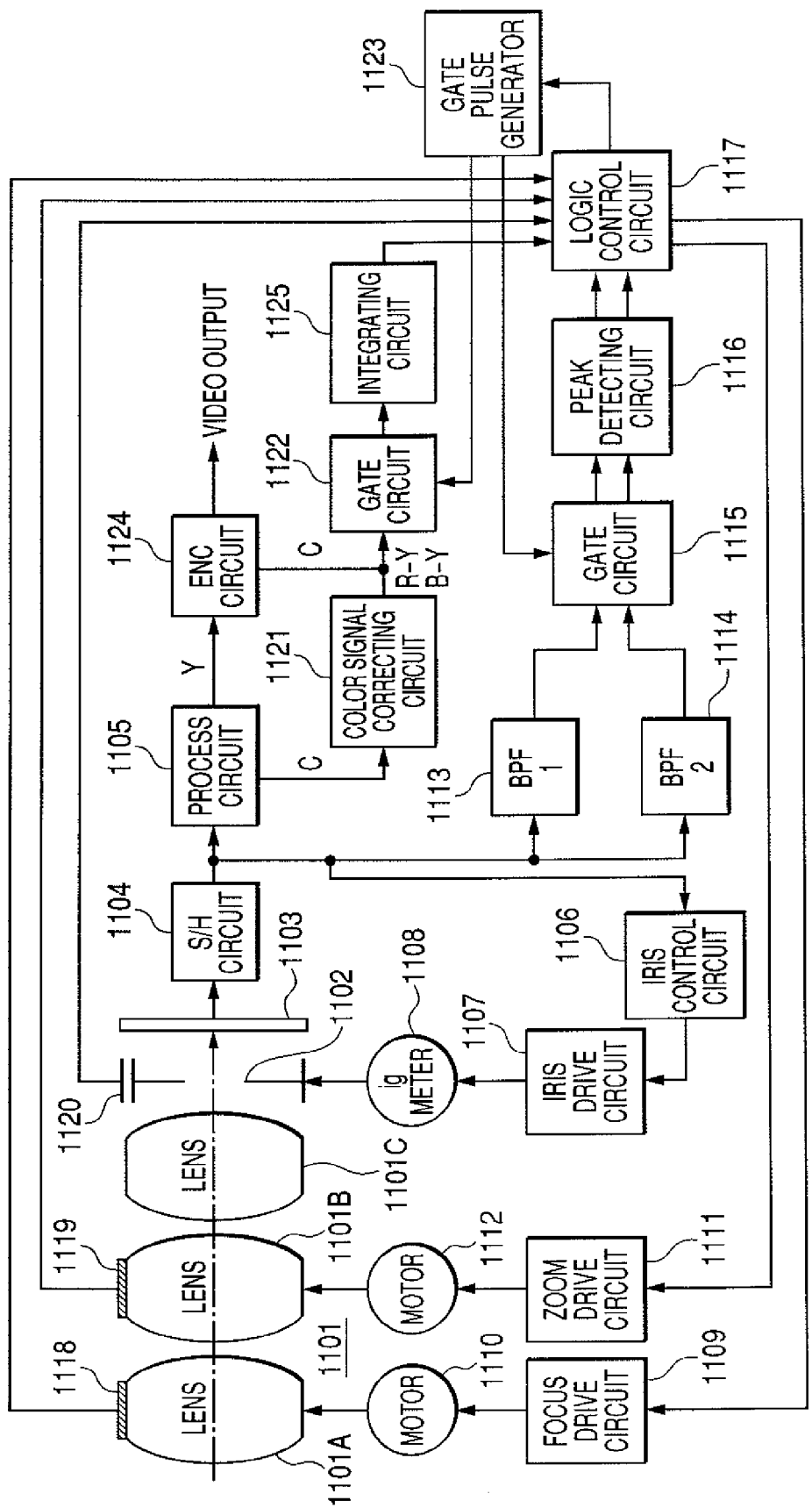
FIG. 11 is a block diagram showing a further embodiment of the present invention which shows an example of the configuration of a video camera.

Next, an embodiment in the case where the solid state image pickup apparatus of each of the embodiments described above is applied to a video camera is described in detail based on FIG. 11.

FIG. 11 is a block diagram showing the case where the solid state image pickup apparatus of each of the embodiments described above is applied to the "video camera." In FIG. 11, a reference numeral 1101 denotes a taking lens equipped with a focus lens 1101A for performing focusing, a zoom lens 1101B performing a zoom operation, and a lens 1101C for image formation.

A reference numeral 1102 denotes a diaphragm. A reference numeral 1103 denotes a solid state image pickup device performing the photoelectric conversion of a subject image imaged on an image pickup surface to convert the subject image into an electric image pickup signal. A reference numeral 1104 denotes a sample hold circuit (S/H circuit) performing the sample hold of the image pickup signal output from the solid state image pickup device 3, and further amplifying the lever of the image pickup signal. The S/H circuit 1104 outputs an image signal.

A reference numeral 1105 is a process circuit performing predetermined processing such as a gamma correction, a color separation, blanking processing and the like to the image signal output from the sample hold circuit 1104. The process circuit 1105 outputs a luminance signal Y and a chroma signal C. The chroma signal C output from the process circuit 1105 receives the corrections of the white balance and the color balance by a color signal correcting circuit 1121, and the corrected chroma signal is output as color difference signals R-Y and B-Y.

Moreover, the luminance signal Y output from the process circuit 1105 and the color difference signals R-Y and B-Y output from the color signal correcting circuit 1121 are modulated by an encoder circuit (ENC circuit) 1124, and are output as a standard television signal. After that, the output standard television signal is supplied to a not shown video recorder or an electric view finder (EVF) such as a monitor EVE.

A reference numeral 1106 denotes an iris control circuit. The iris control circuit 1106 controls an iris drive circuit 1107 based on an image signal supplied from the sample hold circuit 1104, and performs the automatic control of an ig meter to control the opening quantity of the diaphragm 1102 so that the level of the image signal may be a constant value of a predetermined level.

Reference numerals 1113 and 1114 denote band-pass filters (BPE) performing different band limiting for extracting high frequency components necessary for performing in-focus detection of the image signal output from the sample hold circuit 1104. The signals output from the first band-pass filter 1113 (BPF1) and the second band-pass filter 1114 (BPF2) are severally gated by a gate circuit 1115 and a focus gate frame signal, and the peak values of the gated signals are held by a peak detecting circuit 1116 to be input into a logic control circuit 1117.

The signals are called as focus voltages, and the focus is adjusted with the focus voltages.

Moreover, a reference numeral 1118 denotes a focus encoder detecting a moved position of the focus lens 1101A. A reference numeral 1119 denotes a zoom encoder detecting a focus distance of the zoom lens 1101B. A reference numeral 1120 denotes an iris encoder detecting an opening quantity of the diaphragm 1102. The detected values of these encoders are supplied to the logic control circuit 1117 performing the system control.

The logic control circuit 1117 performs in-focus detection to a subject based on an image signal corresponding to the inside of the set in-focus detection region, and performs focusing. That is, the logic control circuit 1117 takes in the peak value information of the high-frequency components supplied from each of the band-pass filters 1113 and 1114, and supplies the control signals of the rotation direction, the rotation speed, the rotation/stop and the like of a focus motor 1110 to a focus drive circuit 1109 so as to drive the focus lens 1101A to a position where the peak value of the high-frequency components may become the maximum. Thus, the logic control circuit 1117 controls the focus drive circuit 1109.

Incidentally, each of the embodiments described above is only examples of the implementation of the present invention, and the sprit and the scope of the present invention should not be limitedly interpreted to these embodiments.

This application claims priority from Japanese Patent Application No. 2005-008182 filed Jan. 14, 2005, which is hereby incorporated by reference herein.

What is claimed is:

1. A solid state image pickup apparatus, comprising:
   a plurality of pixel units, each pixel unit including:
   a photoelectric conversion unit,
   an AD conversion unit for converting an analog signal based on charges photoelectrically converted by the photoelectric conversion unit into a digital signal,
   a charge accumulation unit for accumulating charges generated in the photoelectric conversion unit, and
   a transfer switch for transferring the charges from the photoelectric conversion unit to the charge accumulation unit,
   wherein the AD conversion unit quantifies a digital signal converted from an analog signal based on charges that overflow from the photoelectric conversion unit into the charge accumulation unit at a time of turning off the transfer switch as a bit that is upper or higher than a bit corresponding to a capacity of charges capable of being stored within the photoelectric conversion unit, in converting the analog signal corresponding to the overflowed charges into the digital signal.

2. A solid state image pickup apparatus according to claim 1, wherein the AD conversion unit quantifies a digital signal converted from an analog signal based on charges stored in the photoelectric conversion unit as the bit corresponding to the capacity of charges capable of being stored within the photoelectric conversion unit, in converting the analog signal into the digital signal.

3. A solid state image pickup apparatus according to claim 1, wherein the plurality of pixel units is arranged in a matrix, and
the AD conversion unit includes an A/D converter provided to each column of the matrix.

4. A solid state image pickup apparatus according to claim 3, wherein the A/D converter provided to each column of the matrix is a multi-slope type integrating AD converter.

5. A solid state image pickup apparatus according to claim 4, wherein the multi-slope integrating type AD converter includes a plurality of integrators for a plurality of reference voltages.

6. A solid state image pickup apparatus according to claim 1, wherein the AD conversion unit includes an AD converter that performs a conversion of the analog signal based on the overflowed charges from the photoelectric conversion unit into the digital signal, and that performs a conversion of an analog signal based on charges stored in the photoelectric conversion unit into a digital signal.

7. A solid state image pickup apparatus according to claim 1, wherein the bit corresponding to the capacity of the charges capable of being stored in the photoelectric conversion unit is fixed to a constant value when charges overflow from the photoelectric conversion unit.

8. A solid state image pickup apparatus according to claim 1, wherein the plurality of pixel units includes CMOS sensors.

9. A solid state image pickup apparatus according to claim 1, wherein the AD conversion unit converts an analog signal based on charges transferred from the photoelectric conversion unit to a floating diffusion region.

10. A camera, comprising:
a solid state image pickup apparatus formed of at least a plurality of pixel units,
wherein each pixel unit includes:
a photoelectric conversion unit,
an AD conversion unit for converting an analog signal based on charges photoelectrically converted by the photoelectric conversion unit into a digital signal,
a charge accumulation unit for accumulating charges generated in the photoelectric conversion unit, and
a transfer switch for transferring the charges from the photoelectric conversion unit to the charge accumulation unit, and
wherein the AD conversion unit quantifies a digital signal converted from an analog signal based on charges that overflow from the photoelectric conversion unit into the charge accumulation unit at a time of turning off the transfer switch as a bit that is upper or higher than a bit corresponding to a capacity of charges capable of being stored within the photoelectric conversion unit, in converting the analog signal corresponding to the overflowed charges into the digital signal;
a lens for forming an optical image on the solid sate image pickup apparatus; and
a diaphragm for changing a light quantity passing through the lens.

* * * * *